(12) United States Patent
Girondi

(10) Patent No.: US 6,645,372 B2
(45) Date of Patent: Nov. 11, 2003

(54) UNIT FOR DRAINING WATER FROM A FUEL FILTER

(75) Inventor: Giorgio Girondi, Monaco (IT)

(73) Assignee: UFI Universal Filter International S.p.A, Porto Mantovano (IT)

(*) Notice: Subject to any disclaimer, the term of this patent is extended or adjusted under 35 U.S.C. 154(b) by 0 days.

(21) Appl. No.: 10/258,290

(22) PCT Filed: May 29, 2001

(86) PCT No.: PCT/IB01/00966
§ 371 (c)(1),
(2), (4) Date: Oct. 23, 2002

(87) PCT Pub. No.: WO01/94773
PCT Pub. Date: Dec. 13, 2001

(65) Prior Publication Data
US 2003/0089648 A1 May 15, 2003

(30) Foreign Application Priority Data
Jun. 5, 2000 (IT) .................................. RE2000A0062

(51) Int. Cl.[7] ..................... F02M 37/22; B01D 29/88; B01D 36/00
(52) U.S. Cl. .................. 210/85; 210/86; 210/104; 210/114; 210/121; 210/143; 210/416.4
(58) Field of Search .................. 210/85, 86, 97, 210/104, 114, 109, 138, 121, 123, 143, 167, 168, 171, DIG. 5, 416.4, 416.5, 533; 123/196 A

(56) References Cited

U.S. PATENT DOCUMENTS

| 2,442,379 | A | | 6/1948 | Samiran |
| 3,931,011 | A | | 1/1976 | Richards et al. |
| 4,491,143 | A | | 1/1985 | Yasuhara |
| 5,676,842 | A | * | 10/1997 | Bedi et al. ............... 210/739 |
| 6,083,381 | A | * | 7/2000 | Connelly et al. ......... 210/86 |

FOREIGN PATENT DOCUMENTS

| GB | 2065336 | 6/1981 |
| GB | 2097927 | 11/1982 |
| WO | WO 01/33069 | 5/2001 |

* cited by examiner

Primary Examiner—Terry K. Cecil
(74) Attorney, Agent, or Firm—Browdy and Neimark, PLLC

(57) ABSTRACT

An automatic bleed unit for a fuel filter used particularly in diesel engines includes a filter chamber 5 for accumulating water present in the fuel. Sensors 220, 230 and associated floats 24, 25 are provided for determining the level of water in the chamber. Upon reaching a predetermined level, a microprocessor activates a withdrawal device 7 to drain water from the chamber. The device is only activated when the vehicle engine is at rest and the ignition key is in first switch position that makes the relevant electrical system live. A system that verifies the compatibility between the withdrawal device casing 70 and a base part 20 of the sensing system can also be included.

9 Claims, 3 Drawing Sheets

UNIT FOR DRAINING WATER FROM A FUEL FILTER

TECHNICAL FIELD

This invention relates to improvements in the automatic bleed unit for a disposable filter fully described in PCT/IB00/01527 Published as WO01/33069 A1 in the name of the same Applicant, the text of which is to be considered an integral part of the present description for suitable reference.

BACKGROUND ART

Essentially, the device of said document comprises a sensor means associated with the chamber of the filter for the vehicle fuel (such as diesel oil) in which the water present in said fuel accumulates, a withdrawal device provided for discharging said water when it reaches a predetermined maximum level, and a microprocessor (or electronic card) which is connected to said sensor means and to said withdrawal device such as to activate this latter, with the vehicle engine at rest and the relative electrical system live, when the water reaches said predetermined maximum level.

In particular with said vehicle electrical system there is associated a visual indicator which is activated by the sensor means via the microprocessor, the said microprocessor being arranged to maintain the withdrawal device deactivated when the vehicle engine rotates and said visual indicator is energized. Said sensor means also comprises two mutually movable elements, of which one is permanently associated with the shell of the filter in which the water collects, and which is disposable, whereas the other is positioned inside a casing which contains said microprocessor and said withdrawal device, is removably connected to said shell, and is permanently associated with the vehicle.

For further details reference should be made to the text of the application cited in the introduction.

A problem which has been encountered in using the aforedescribed unit derives from the fact that the sensor means may sometimes not intervene due to its two component elements being unable to move relative to one another, and the difficulties resulting therefrom. Investigations have shown that said lack of intervention is mainly due to at least one of the following reasons.

Materials such as impurities, dirt or adhesive lumps can deposit on the element permanently associated with the vehicle, to hinder sliding of the element associated with the filter, even when this is new and clean.

In addition, as one of the two elements is replaced when the filter is replaced, dimensional inaccuracies can occur between these elements, particularly if the used and new filters pertain to different batches or originate from different operating lines. In this case coupling inaccuracies and/or misalignments thereof can occur when the shell of the new filter is connected to said water withdrawal device.

The main object of the present invention is to obviate the aforesaid problem within the context of a simple, rational, reliable and economical construction.

DISCLOSURE OF THE INVENTION

Said object is attained by virtue of the characteristics indicated in the claims.

In attaining said object, according to the invention said sensor means of the known unit cited in the introduction is made to consist of a differential water level reading and monitoring system comprising two measurement members, each sensitive to a level between the maximum predetermined level and the depth of said accumulation chamber, said two measurement members being connected to the unit microprocessor such that, with the vehicle engine at rest and the relative electrical system live, it energizes said withdrawal device in response to the signal received from one or other of said two members.

Moreover, apart from the respective external electric cabling, and as will be apparent hereinafter, the constituent elements of said two measurement members are advantageously permanently positioned in the lower part of the accumulation chamber of the disposable filter.

Finally, means described hereinafter are interposed between said differential reading and monitoring system and that part of the bleed unit permanently associated with the visual indicator, to verify the compatibility between the filter and the bleed unit. By virtue of the aforegoing, all the objects of the invention are attained.

In this respect, the danger of non-intervention of the sensor means is reduced to a minimum in that on the one hand the activation signal for the bleeding stage is generated even if the reading member is disabled by the presence of excessive deposits of foreign material, and on the other hand a filter having characteristics different from those required by the bleed unit cannot be mounted.

The constructional and operational characteristics and merits of the invention will be apparent from the ensuing detailed description, given with reference to the figures of the accompanying drawings, which show two preferred embodiments thereof by way of non-limiting example.

DETAILED DESCRIPTION OF THE INVENTION

Figure 1:
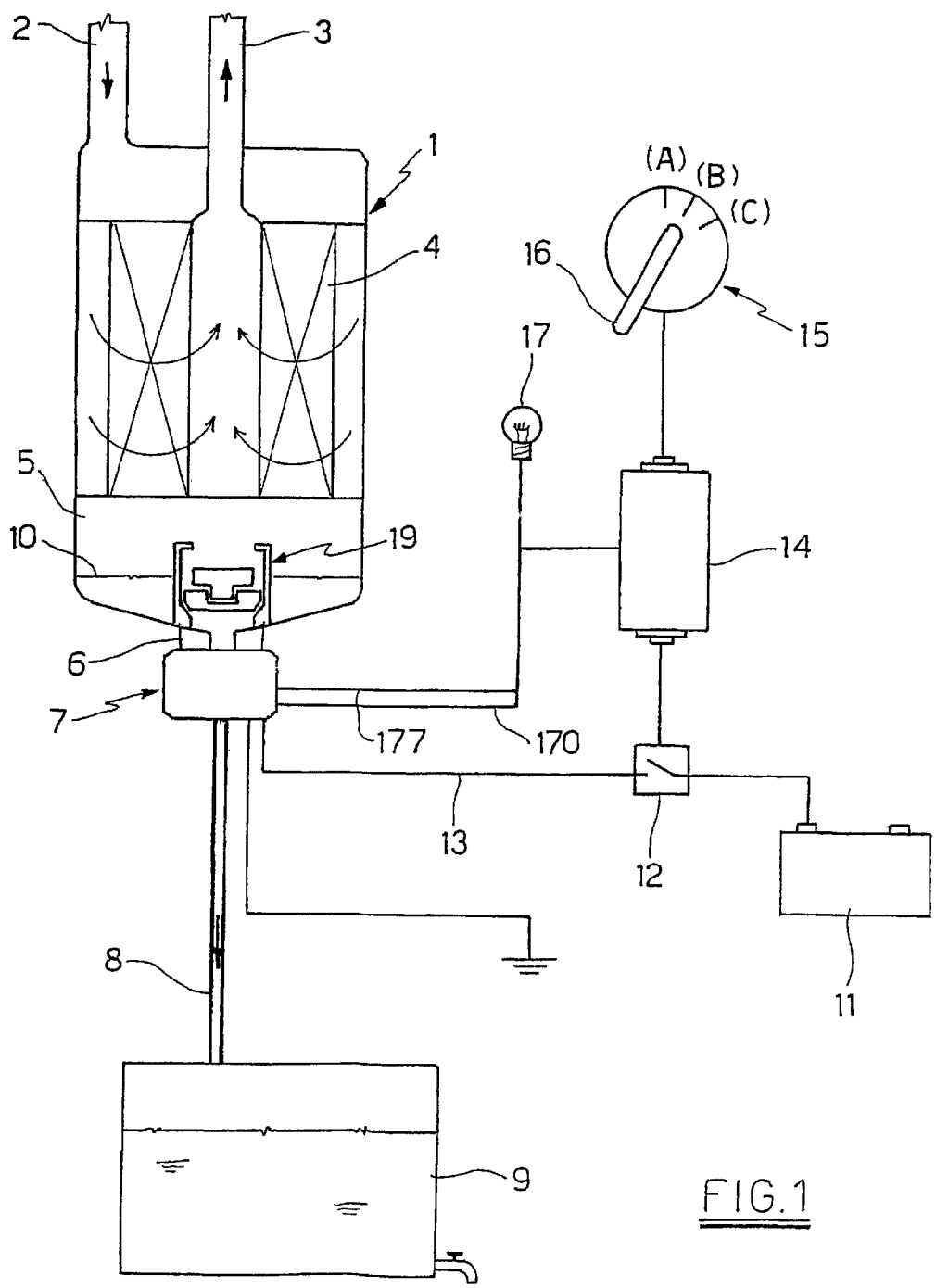
FIG. 1 is an overall scheme showing the main components of the unit.

Said figures, and in particular FIG. 1, show a filter 1 of the disposable cartridge type, known overall, comprising, starting from the top downwards, a conduit 2 through which the fuel (such as diesel oil) to be filtered arrives, a conduit 3 through which the filtered fuel leaves, a filtering diaphragm 4, a chamber 5 for collecting the water separated from said fuel, and a discharge port 6 for said water.

In said port 6 there is housed a differential reading and monitoring system, described hereinafter, for the level 10 of the water present in the chamber 5, below the port 6 there being a water withdrawal device 7 from which there branches a conduit 8 leading to an accumulation vessel 9.

The device 7 is permanently installed on the vehicle provided with the filter 1, and is incorporated in the respective electrical system. It is connected to the battery 11 by the cable 13 via the switch 12.

The switch 12 is controlled by the microprocessor or electronic card 14, which is connected to the ignition switch 15 of said vehicle.

In the usual manner, by means of the key 16 said ignition switch 15 can assume three positions indicated by A, B and C respectively, in the first A of which the vehicle engine is stationary and the respective electrical system is switched off, in the second B the engine is at rest and the electrical system is energized, and in the third C the engine rotates and the electrical system is live.

According to a first embodiment of the invention, in the vehicle passenger compartment, typically on the dashboard, there is a warning lamp 17, usually present on most vehicles, typically those with a diesel engine.

Said lamp 17 is connected to a differential reading and monitoring system for the level 10 by the cable 170, and is controlled by the card 14. Said cable 170 presents a branch 177, also connected to said differential level reading and monitoring system, the purpose of said branch being apparent hereinafter.

Figure 2:
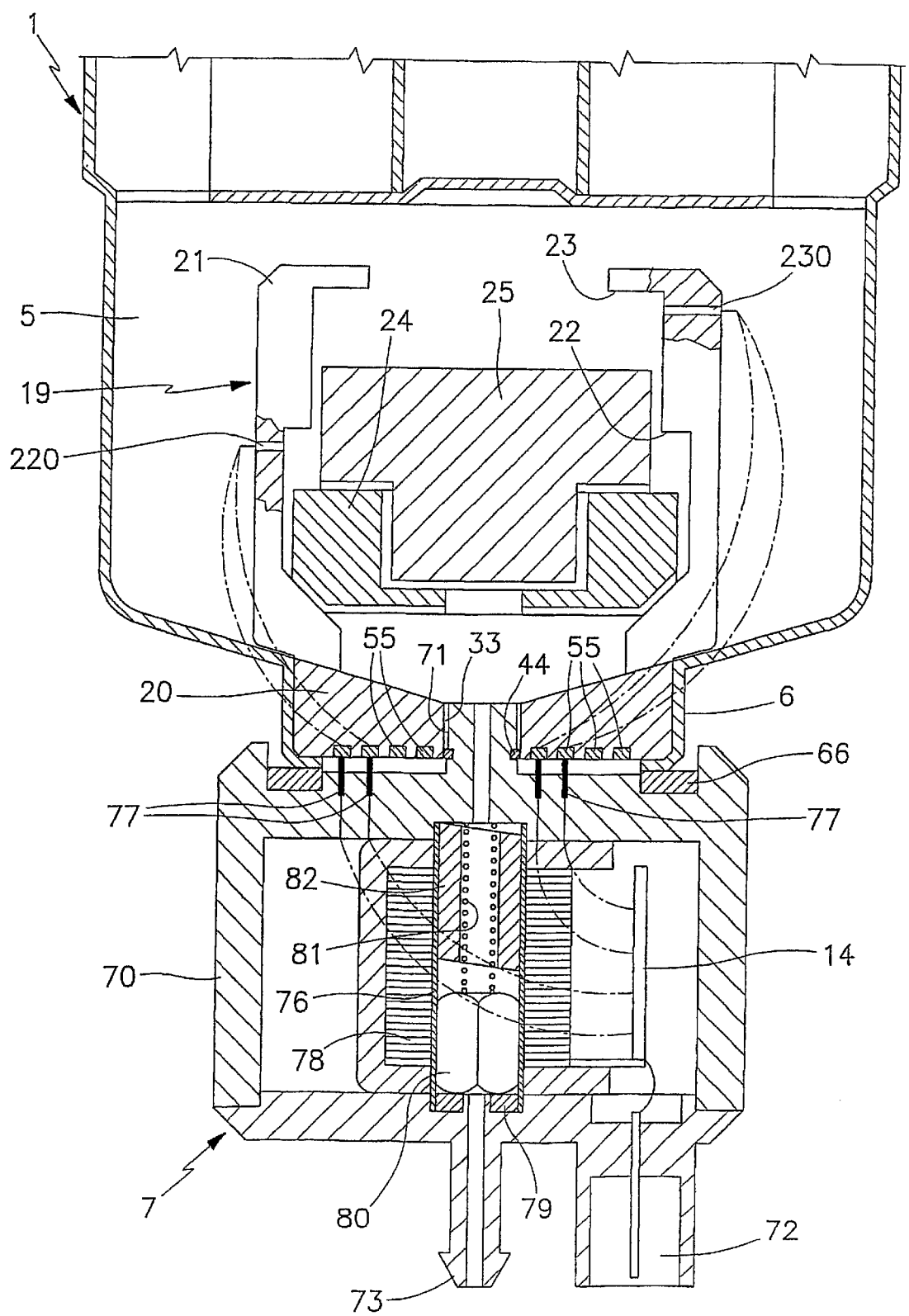
FIG. 2 is an axial section showing the discharge port of the disposable filter of FIG. 1, said filter being of the type operating with its cartridge under pressure.
Figure 3:
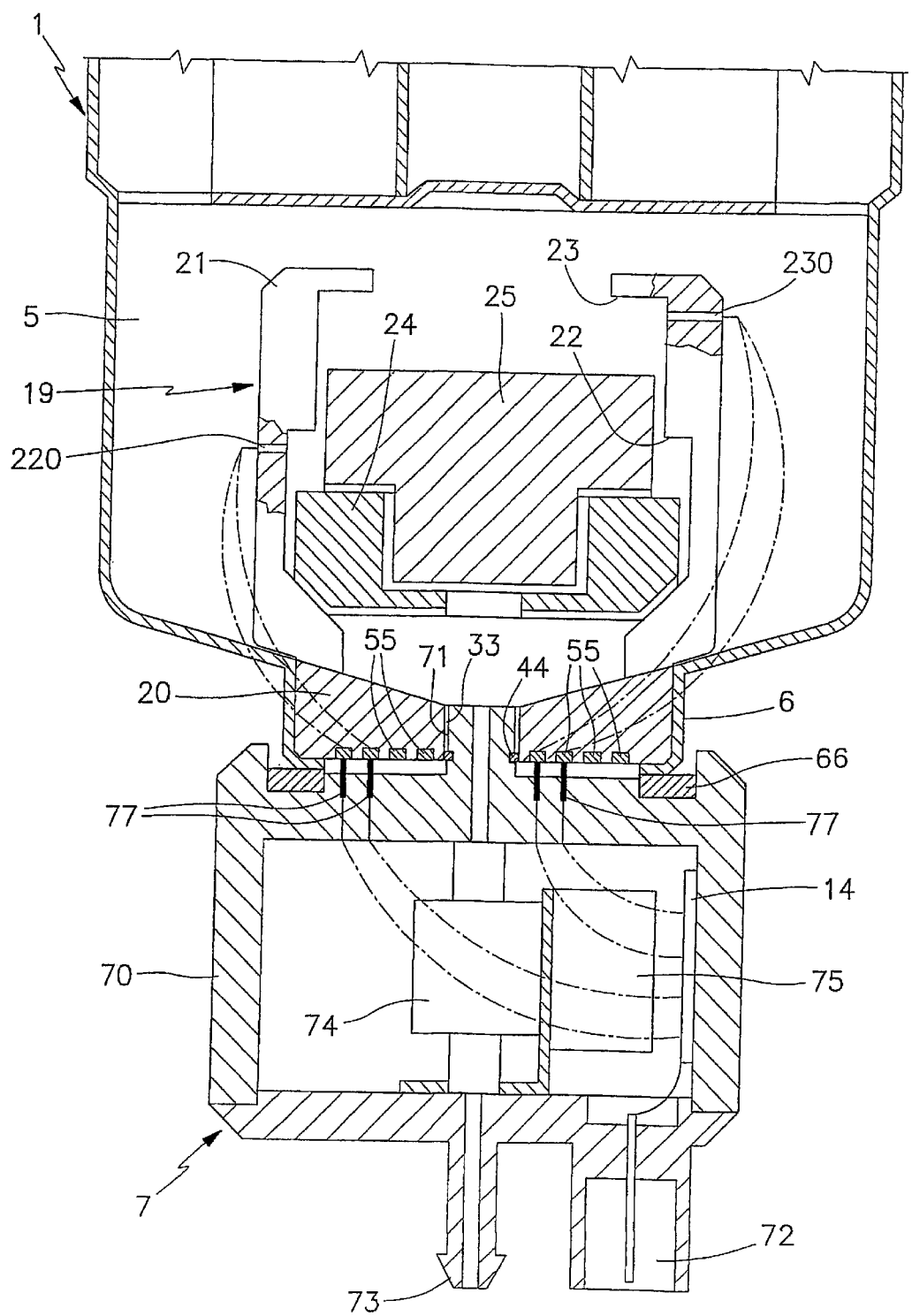
FIG. 3 is a view similar to the preceding, where the filter shown is of the type operating with its cartridge under vacuum.

Said differential level reading and monitoring system comprises, as shown in FIGS. 2 and 3, a cup-shaped member 19 the base part 20 of which is centrally provided with a threaded through hole 33 and is sealed inside the port 6 of the filter 1.

The wall of said cup-shaped member is defined by three (or more) angularly equidistant salient fins 21 each presenting two inwardly projecting shoulders, namely a lower 22 and an upper 23.

The shoulders 22 and 23 define the upward travel limit of respective floats 24 and 25 contained within the member 19 with a certain radial slack.

Said floats 24 and 25 have a specific gravity between that of water and that of the fuel.

The lower float 24 is shaped as a cup, in the base of which there is a central hole coaxial with the hole 33 in the base of the member 19.

The upper float 25 is shaped in the manner of a mushroom the stem of which is contained, with a certain radial slack, in the cavity of the underlying float 24.

When the level 10 of the water present in the filter collection chamber 5 is insufficient to raise the floats, as shown in FIGS. 2 and 3, the head of said mushroom shape rests against the upper circumferential edge of the lower float 24, and the stem of said mushroom shape is slightly spaced from the base of said lower float 24.

This is to prevent any inconvenient sticking between the two floats, seeing that the foreign material separated from the fuel tends to accumulate in the lowest part of the chamber 5. Respective sensors 220 and 230 are positioned at said shoulders 22 and 23.

In a first embodiment said sensors 220 and 230 are magnetic proximity microswitches, in which case the floats 24 and 25 are suitably magnetized, for example by means of a thin metal strip wrapped about their end.

Alternatively said sensors 220 and 230 can consist of optical sensors sensitive to the colour, the same or different, of the respective floats 24 and 25.

Said sensors 220 and 230 are electrically powered via a recognition system arranged to identify compatibility between the disposable filter 1 and that part of the bleed unit permanently associated with the vehicle, which in the illustrated example is the withdrawal device 7.

This latter comprises a casing 70 presenting at its top an externally threaded hollow stem 71 screwed into the hole 33 in the base part 20 with a gasket 44 therebetween.

Concentrically to said stem 71, on the lower face of the base part 20, there are embedded four electrically conductive annular tracks 55, external to which there is an annular gasket 66 clamped between the casing 70 and the port 6.

The outer pair of tracks 55 is electrically connected to the sensor 220, the inner pair being connected to the sensor 230. Against said two pairs of tracks 55 there rest respective pairs of underlying electrically conductive push rods 77 which are slidingly mounted on the upper wall of the casing 70 via suitable interposed elastic thrust means, not shown in the figures, for example in the form of leaf springs.

The aforedescribed electrical connection of interface type forms said system for identifying compatibility between the disposable filter 1 and that part of the bleed unit associated with the vehicle.

Said push rods 77 are electrically connected to the card 14 positioned in the casing 70 and connected in its turn to the vehicle electrical system by the push-on connector 72.

To the side of the connector 72 there is a water discharge spout 73 which at its bottom is connected to the conduit 8 (see FIG. 1) and at its top communicates with the stem 71 via the following interposed means.

In the case of a filter 1 with a vacuum cartridge (see FIG. 3), said means comprise a micropump 74 interposed between said spout 73 and stem 71, and driven by an electrical micromotor 75 powered by the battery 11 when enabled by the card 14, said micropump, micromotor and card being housed in the casing 10.

In the case of a filter with a pressure cartridge (see FIG. 2), said means consist of a normally closed solenoid valve.

This comprises a tube 76 sealedly clamped between said stem 71 and spout 73, to form the core of a coil 78 electrically connected to the card 14.

Inside said tube 76 there are provided, from the bottom upwards, a gasket 79, a valving element 80, a compressed spring 81 for maintaining the visual indicator constantly urged elastically towards the closure position, and a jacket 82 wrapping the upper part of the spring 81 to define the extent of opening travel of the visual indicator 80.

The invention operates as follows.

With reference to FIG. 1, in which it can be seen that the sensors 220 and 230 are connected in parallel with the lamp 17, when the level of the water 10 is below the predetermined value the lamp 17 remains extinguished whatever the position of the ignition switch 15, and the floats 24 and 25 adapt to said level. Under normal operating conditions the lower float 24 rises carrying with it the upper float 25.

When the water 10 exceeds said predetermined level, and the vehicle electrical system is energized, the sensor 220 senses the presence of the lower float 24 and emits a signal causing the lamp 17 to light. The lamp 17 could for example remain lit continuously, for the reason given hereinafter.

If the vehicle engine rotates, the card 14 inhibits intervention of the withdrawal device 7, whereas if the engine is at rest the card 14 energizes the device 7 for a predetermined period sufficient for all the water present in the chamber 5 to be discharged, with simultaneous extinguishing of the lamp 17.

If the lower float 24 is unable to rise, for example because it adheres to the soiled face of the base part 20, only the upper float 25 rises, the procedure being repeated identically when the upper sensor 230 senses the presence of said upper float 25.

The electronic card 14 is preferably provided with means for selecting the energization time of the withdrawal device 7 depending on the specific sensor activated.

This is because activation of the sensor 230 means that there is a greater accumulation of water 10 than that associated with activation of the sensor 220. Consequently in the former case the period of energization of the device 7 is correspondingly greater. Advantageously, according to the invention the electronic card 14 is provided with means for indicating possible lack of energization of the withdrawal device 7 when the water has reached the predetermined level, which may be due either to non-raising of the lower float 24 as already stated, or non-intervention of the lower sensor 220, for example due to a fault.

Said means are typically arranged to energize the warning lamp 17 in a different manner depending on which sensor has emitted the overfull signal.

For example the lamp 17 may as stated emit continuous light when the lower sensor 220 is activated, and the same lamp 17 emit intermittent light when the upper sensor 230 is activated. Preferably the lamp 17 is energized in the said intermittent manner starting from the second activation of the upper sensor 230.

By this means the vehicle driver is warned that the unit is operating abnormally.

The merits and advantages of the invention are apparent from the aforegoing and from an examination of the accompanying figures. The invention is not limited to that illustrated and described, but covers all the technical equivalents of the invention and their combinations, if implemented within the context of the following claims.

What is claimed is:

1. A unit for automatically bleeding off the water which separates in a fuel filter of a vehicle, the vehicle having an engine and a switch means, said switch means operated by an ignition key and having a first activation position in which the unit is activated but the engine remains switched off, the unit comprising:

a disposable container containing a filtering diaphragm;

a separated water collection chamber provided in a bottom thereof with a discharge port for said water;

a withdrawal device permanently associated with the vehicle for discharging said water when water in said collection chamber reaches a predetermined level;

a sensor means permanently associated with the chamber; and a microprocessor connected to said sensor means and to said withdrawal device such as to activate said withdrawal device when the water reaches said predetermined level, wherein said sensor means comprises a differential level reading and monitoring system sensitive to a level between said predetermined level and a bottom of said collection chamber and connected to said microprocessor, said differential level reading and monitoring system comprising a cup-shaped guide member, of which a base part thereof is centrally holed and sealed inside the collection chamber discharge port, and a wall thereof is perforated and positioned to enclose two coaxial floats having a specific gravity between that of the fuel and that of water, and a respective sensor being associated with each individual float such that said microprocessor energizes said withdrawal device in response to a signal emitted by either of said sensors when the ignition key is in said first activation position.

2. A unit as claimed in claim 1, characterized in that one of said floats faces the base of said cup-shaped guide member and is shaped as a centrally holed bowl, and the other float is shaped as a mushroom, the stem of which is inserted stackingly into the cavity of said bowl-shaped float.

3. A unit as claimed in claim 2, characterized in that said cup-shaped guide member is provided with respective stops limiting the upward travel of said floats, said sensors being positioned at said stops.

4. A unit as claimed in claim 3, characterized in that said sensors comprise magnetic proximity microswitches.

5. A unit as claimed in claim 3, characterized in that said sensors comprise optical sensors.

6. A unit for automatically bleeding off the water which separates in a fuel filter of a vehicle, the vehicle having an engine and a switch means, said switch means operated by an ignition key and having a first activation position in which the unit is activated but the engine remains switched off, the unit comprising:

a disposable container containing a filtering diaphragm;

a separated water collection chamber provided in a bottom thereof with a discharge port for said water;

a withdrawal device permanently associated with the vehicle for discharging said water when water in said collection chamber reaches a predetermined level;

a sensor means permanently associated with the chamber;

a microprocessor connected to said sensor means and to said withdrawal device such as to activate said withdrawal device when the water reaches said predetermined level, wherein said sensor means comprises a differential level reading and monitoring system comprising a cup-shaped guide member and two measurement members, each measurement member sensitive to a level between said predetermined level and the bottom of said collection chamber, and connected to said microprocessor such that said microprocessor energizes said withdrawal device in response to a signal emitted by one or other of said measurement members when the ignition key is in said first activation position, said microprocessor and said withdrawal device being positioned in a casing to be permanently associated with the vehicle and sealedly coupled removably to the discharge port of the chamber; and a system for verifying the compatibility between the disposable container and the withdrawal device being interposed between said differential level reading and monitoring system and said microprocessor, wherein said compatibility verification system comprises (i) two pairs of electrically conductive annular tracks positioned on an outside of a base of said cup-shaped guide member and connected to said two measurement members, and (ii) two pairs of electrically conductive and elastically yieldable push rods positioned on a top of said casing and connected to said microprocessor.

7. A unit as claimed in claim 6, characterized in that said two measurement members are connected in parallel with a common warning lamp.

8. A unit as claimed in claim 7, characterized in that said microprocessor is provided with means arranged to differently energize said warning lamp depending on which measurement member has emitted an overfull signal.

9. A unit as claimed in claim 6, characterized in that said microprocessor is provided with timer means arranged to select the period of activation of the water withdrawal device on the basis of which measurement member has emitted an overfull signal.

* * * * *